(12) United States Patent
Fukasaku et al.

(10) Patent No.: US 8,138,643 B2
(45) Date of Patent: Mar. 20, 2012

(54) MOTOR-DRIVEN COMPRESSOR

(75) Inventors: Hiroshi Fukasaku, Kariya (JP); Ken Suitou, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 515 days.

(21) Appl. No.: 12/425,934

(22) Filed: Apr. 17, 2009

(65) Prior Publication Data

US 2009/0269222 A1    Oct. 29, 2009

(30) Foreign Application Priority Data

Apr. 25, 2008    (JP) ................. 2008-115829

(51) Int. Cl.
*H02K 3/50*    (2006.01)
(52) U.S. Cl. .......................... 310/71; 310/179
(58) Field of Classification Search .................. 310/71, 310/179, 207, 260, 270; 174/113 R, 120 C, 174/137 R, 138 R, 149 R
See application file for complete search history.

(56) References Cited

U.S. PATENT DOCUMENTS

| | | | |
|---|---|---|---|
| 3,748,510 A * | 7/1973 | McNeal | 310/71 |
| 6,137,198 A * | 10/2000 | Kawamura | 310/71 |
| 6,333,579 B1 * | 12/2001 | Hirano et al. | 310/194 |
| 6,531,797 B2 * | 3/2003 | Eydelie et al. | 310/71 |
| 7,902,702 B2 * | 3/2011 | Hashiba | 310/71 |

FOREIGN PATENT DOCUMENTS

| | | | |
|---|---|---|---|
| JP | 58182444 A | * | 10/1983 |
| JP | 2001-182655 A | | 7/2001 |
| JP | 2002-044892 A | | 2/2002 |
| JP | 2005-278289 A | | 10/2005 |

* cited by examiner

*Primary Examiner* — Tran Nguyen
(74) *Attorney, Agent, or Firm* — Locke Lord LLP

(57) ABSTRACT

An electric motor includes a cylindrical stator that is formed with a plurality of slots. The cylindrical stator has polyphase coils that are formed by winding a plurality of conductive wires in the slots to have polyphase, a wire bundle and an insulating tube covering the wire bundle. Each conductive wire includes a core wire and an insulator that covering the core wire. The wire bundle has a drawing portion, a connecting portion and an elongated portion that is elongated between the drawing portion and the connecting portion for increasing creepage distance between the connecting portion and the housing thereby to increase insulation resistance. The connecting portion of the wire bundle provides a neutral point of the electric motor. The elongated portion and the connecting portion of the wire bundle are covered with the insulating tube.

10 Claims, 5 Drawing Sheets

MOTOR-DRIVEN COMPRESSOR

BACKGROUND OF THE INVENTION

The present invention relates to a motor-driven compressor having a metal housing, an electric motor housed in the metal housing and a compression unit also housed in the metal housing and compresses refrigerant by being driven by the electric motor, wherein a neutral point of the electric motor is formed by a connecting portion that connects core wires of polyphase coils of the electric motor.

Metal housing of a motor-driven compressor generally houses therein not only an electric motor but also a compression unit compresses refrigerant by being driven by the electric motor. In such a motor-driven compressor, the refrigerant circulates through the compressor in gaseous form during its normal operation. When the compressor is stopped and the gaseous refrigerant in the housing is cooled, however, the refrigerant may be liquefied and collected in the housing in the form of a liquid. The liquid refrigerant has a lower specific resistivity than the gaseous refrigerant. Though varying depending on the kind of oil, some oils used to lubricate the motor-driven compressor may reduce its specific resistivity by being mixed with the liquid refrigerant.

If any conductive portion of the electric motor that is exposed to the interior of the housing is put in the liquid refrigerant collected in the housing, therefore, the conductive portion and the housing are electrically conducted through the liquid refrigerant. In addition, insulation resistance between the conductive portion and the housing is reduced by a decrease of the specific resistivity of the liquid refrigerant. If the motor-driven compressor with a decreased insulation resistance is started, there is a fear that electric current supplied to the conductive portion may leak to the housing through the liquid refrigerant and oil.

Japanese Unexamined Patent Application Publication No. 2001-182655 proposes a motor-driven compressor according to which the insulation resistance between the conductive portion and the housing through the liquid refrigerant is increased. The motor-driven compressor includes a feeder terminal as the above conductive portion that is held by the base of a metal housing through an insulating member. The feeder terminal and the insulating member that are located inside the metal housing are covered with an insulating resin tube.

The insulating resin tube covers the feeder terminal with one end of the insulating resin tube set in close contact with the insulating member. If liquid refrigerant is collected in the metal housing, leakage current between the feeder terminal and the base flows through the liquid refrigerant having the lowest specific resistivity therebetween. Thus, the insulation resistance between the feeder terminal and the base depends on the creepage distance along the insulating resin tube and the insulating member and on the area of the passage of the liquid refrigerant through which the leakage current flows. Because the insulating resin tube is set in close contact with the insulating member, the creepage distance is higher as compared to the case where no such insulating resin tube is provided, so that the insulation resistance is increased.

The electric motor of a motor-driven compressor includes three-phase coils having a U-phase coil, a V-phase coil and a W-phase coil. The ends of the three-phase coils are drawn out therefrom and connected together to form a connecting portion as the conductive portion, which provides a neutral point of the electric motor. Japanese Unexamined Patent Application Publication No. 2005-278289 discloses a neutral terminal device of a rotating electric machine which is designed to prevent a short circuit between the conductive wires of the coils of the rotating electric machine and the ends of the neutral lines of the coils. The neutral terminal is formed so that the ends of the neutral lines do not project out from a metal sleeve and the neutral terminal is covered with an insulation cap.

However, if the connecting portion of the coils as the neutral point is put in the liquid refrigerant, the connecting portion and the housing are electrically conducted through the liquid refrigerant. In addition, the insulation resistance between the connecting portion and the housing is reduced by a decrease of the specific resistivity of the liquid refrigerant. As a result, there is a fear that electric current supplied to the connecting portion may leak to the housing through the liquid refrigerant. However, Japanese Unexamined Patent Application Publication No. 2001-182655 discloses no insulation between the neutral point of the electric motor and the housing.

In order to reduce the production cost of an electric motor, the neutral point is generally formed in such a way that the length of the conductive wire that is drawn out from the coil and the length of the connecting portion are as small as possible. In addition, to prevent the neutral point from interfering with the housing or the coil, the neutral point is formed as short as possible. Merely covering the neutral terminal as the neutral point with the insulation cap as in the case of Publication No. 2005-278289 only provides poor insulation resistance between the neutral terminal and the housing when the liquid refrigerant enters into the insulation cap and the neutral terminal is put in the liquid refrigerant.

The present invention, which has been made in light of the above problems, is directed to a motor-driven compressor wherein insulation resistance between a connecting portion and a housing of the compressor when liquid refrigerant is collected in the housing is increased.

SUMMARY OF THE INVENTION

In accordance with an aspect of the present invention, there is provided a motor-driven compressor that includes a metal housing, a compression unit and an electric motor. The compression unit for compressing refrigerant is housed in the housing. The electric motor for driving the compression unit is housed in the housing. The electric motor includes a cylindrical stator that is formed with a plurality of slots separated by teeth. The cylindrical stator has polyphase coils that are formed by winding a plurality of conductive wires in the slots to have polyphase, a wire bundle that is formed by drawing out one end of each conductive wire from the polyphase coils and binding the ends of the conductive wires together, and an insulating tube covering the wire bundle. Each conductive wire includes a core wire and an insulator that covers the core wire. The wire bundle has a drawing portion that draws out the conductive wires from the polyphase coils, a connecting portion where the core wires of the conductive wires are connected at the ends of the conductive wires together and an elongated portion that is elongated between the drawing portion and the connecting portion for increasing creepage distance between the connecting portion and the housing thereby to increase insulation resistance. The connecting portion of the wire bundle provides a neutral point of the electric motor. The elongated portion and the connecting portion of the wire bundle are covered with the insulating tube.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
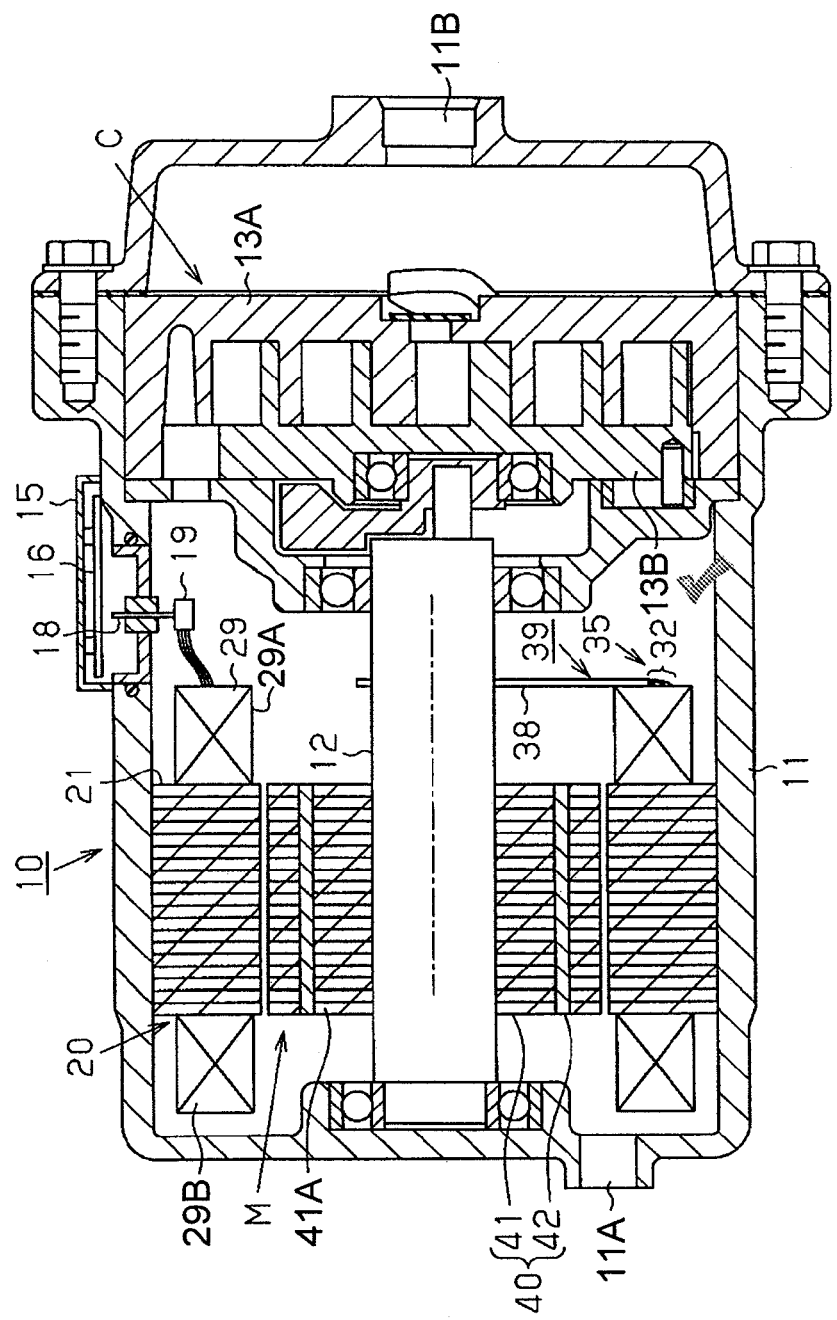
FIG. 1 is a longitudinal sectional view showing a motor-driven compressor according to one embodiment of the present invention.

The following will describe a motor-driven compressor according to one embodiment of the present invention with reference to FIGS. 1 through 5, 6A and 6B. Referring to FIG. 1, there is shown a motor-driven compressor 10 having a housing 11 made of a die-cast metal such as aluminum alloy. A rotary shaft 12 is rotatably supported in the housing 11 and an electric motor M is housed in the housing 11 for driving to rotate the rotary shaft 12. In addition, a compression unit C which is operable to compress refrigerant gas in accordance with the rotation of the rotary shaft 12 is housed in the housing 11.

The compression unit C is of a scroll type, including a fixed scroll 13A and a movable scroll 13B. An inlet port 11A is formed in the housing 11 for allowing refrigerant gas to be drawn into the housing 11. The compression unit C is operable to compress gaseous refrigerant (or refrigerant gas) by rotating the movable scroll 13A relative to the fixed scroll 13A in accordance with the rotation of the rotary shaft 12. During the operation of the compression unit C, refrigerant gas under a low temperature and a low pressure in the external refrigeration system (not shown) is drawn from the inlet port 11A into the compression unit C while passing close to the electric motor M. The refrigerant gas drawn into the compression unit C is increased in temperature and pressure by being compressed by the compression unit C and then discharged to the external refrigeration system through an outlet port 11B formed in the housing 11. Although the refrigerant passes through the motor-driven compressor 10 in the form of a gas during its normal operation, the refrigerant (or liquid refrigerant) may be liquefied when the operation of the motor-driven compressor 10 is stopped and the refrigerant gas remaining in the housing 11 is cooled, so that the refrigerant is collected in the housing 11 in the form of a liquid.

An inverter cover 15 is joined to the housing 11 and a motor drive circuit 16 for driving the electric motor M is housed inside the inverter cover 15. A hermetically sealed terminal 18 is fixed to the housing 11 at a position inside the inverter cover 15. The hermetically sealed terminal 18 is electrically connected to the motor drive circuit 16 through lead wire (not shown). An input terminal 19 is connected to the hermetically sealed terminal 18 for allowing signal of the motor drive circuit 16 to be transmitted to the electric motor M. Thus, the electric motor M is driven by receiving electric power from the motor drive circuit 16. Lubricating oil (such as polyalkylene glycol) in the form of a mist is mixed with refrigerant gas, serving to lubricate various sliding surfaces in the motor-driven compressor 10. This lubricating oil has a characteristic that reduces its specific resistivity by being mixed with liquid refrigerant.

The following will describe the electric motor M in detail. The electric motor M includes a rotor 40 and a cylindrical stator 20. The rotor 40 has a rotor core 41 and a plurality of flat permanent magnets 42 that are embedded in the rotor core 41. The rotor core 41 is made of a plurality of core sheets 41A laminated together and each made of a magnetic material such as steel sheet. The rotor core 41 is fixedly mounted on the rotary shaft 12.

Figure 2:
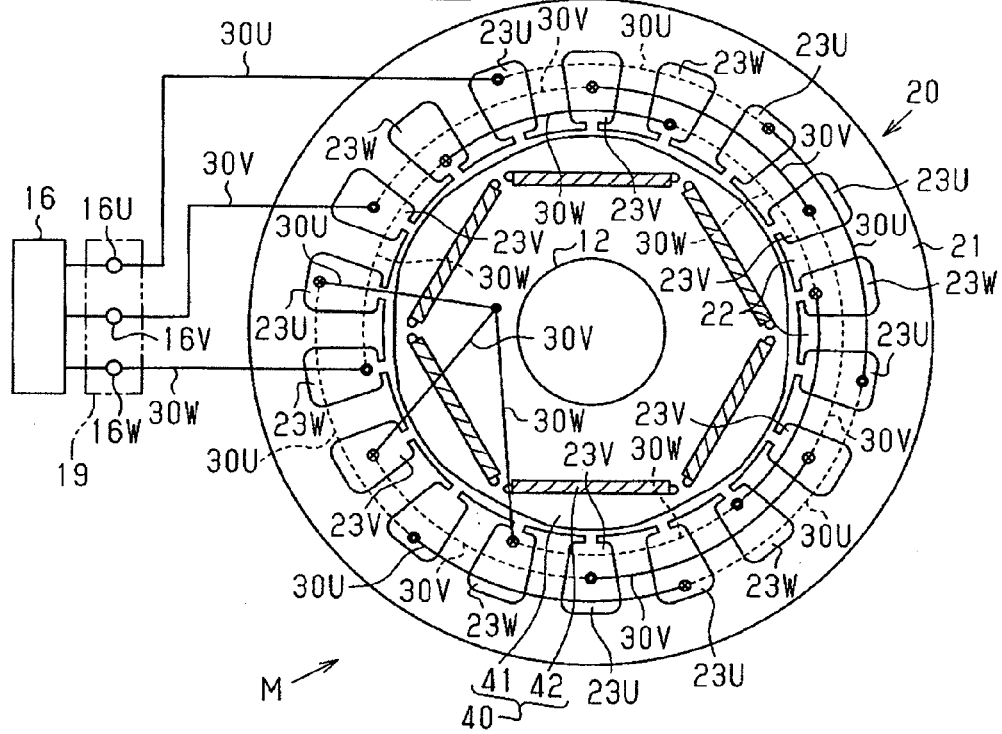
FIG. 2 is an illustrative schematic view of wave winding of an electric motor of the motor-driven compressor of FIG. 1.
Figure 3:
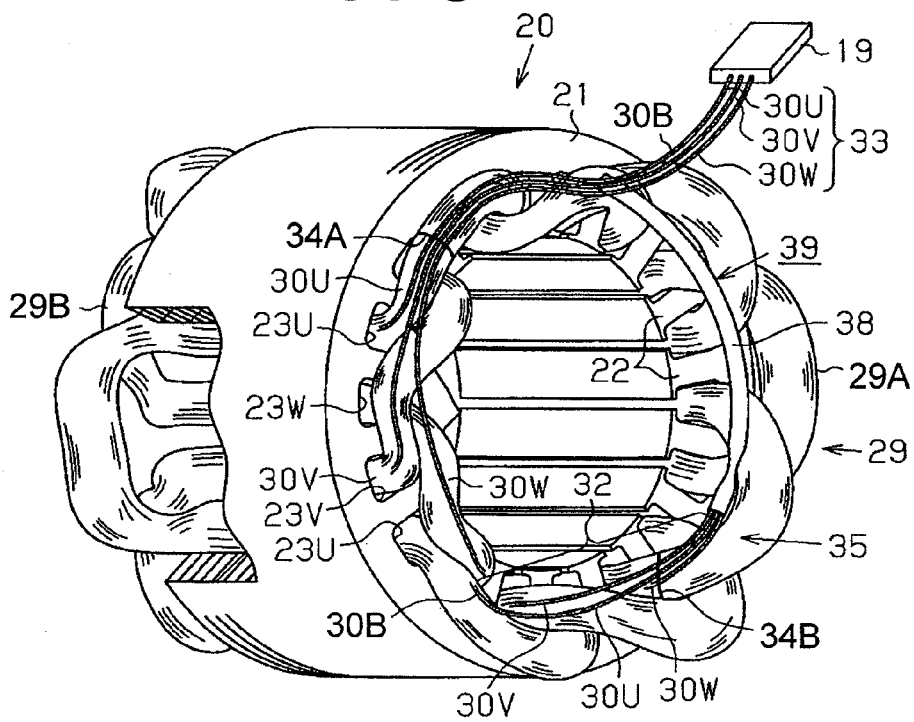
FIG. 3 is a perspective view showing a stator of the electric motor.

As shown in FIGS. 2 and 3, the stator 20 has a cylindrical stator core 21 and three-phase coils 29. The stator core 21 has in the inner periphery thereof a plurality of teeth 22 and a plurality of slots 23U, 23V, 23W each formed between any two adjacent teeth 22. The three-phase coils 29 have a U-phase coil 30U, a V-phase coil 30V and a W-phase coil 30W that are formed by winding conductive wires in the slots 23U, 23V, 23W in the manner of wave winding, respectively. Each of the coils 30U, 30V and 30W includes a core wire 30A made of copper and an insulator 30B made of enamel and covering the core wire 30A (refer to FIG. 4).

As shown in FIG. 2, the U-phase coil 30U having one end thereof connected to a terminal 16U of the motor drive circuit 16 through the input terminal 19 is inserted in a group of first slots 23U. In a similar manner, the V-phase coil 30V having one end thereof connected to a terminal 16V of the motor drive circuit 16 through the input terminal 19 is inserted in a group of second slots 23V. In a similar manner, the W-phase coil 30 W having one end thereof connected to a terminal 16W of the motor drive circuit 16 through the input terminal 19 is inserted in a group of third slots 23W.

Still referring to FIG. 2, the solid line of each coil 30U, 30V, 30W indicates the portion of the coil 30U, 30V, 30W that is wired on one end face of the stator 20 (or coil end 29A, refer to FIG. 3). The broken line of each coil 30U, 30V 30W indicates the portion of the coil 30U, 30V, 30W that is wired on the other end face of the stator 20 (or coil end 29B, refer to FIG. 3). The connection between the solid line and the broken line of each coil 30U, 30V, 30W indicates the portion of the coil 30U, 30V, 30W that is inserted in the slot 23U, 23V, 23W.

The ends of the coils 30U, 30V and 30W which are connected to the terminals 16U, 16V and 16W are drawn out from the coil end 29A to form an extension 33 as shown in FIG. 3. The extension 33 is fixed at a position adjacent to the three-phase coils 29 to the coil end 29A by a lacing cord 34A and connected at the end thereof that is far from the three-phase coils 29 to the input terminal 19.

Figure 5:
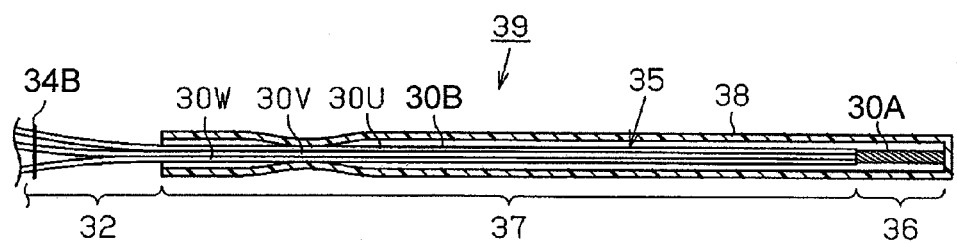
FIG. 5 is a longitudinal sectional view showing a covered bundle portion wherein the wire bundle is inserted in the insulating tube.

The other ends of the coils 30U, 30V and 30W are drawn out from the coil end 29A and bound together to form a wire bundle 35 as shown in FIG. 5. The wire bundle 35 has a drawing portion 32 that draws out the conductive wires from the three-phase coils 29 and located adjacent thereto. The wire bundle 35 is positioned relative to the coils 29 when the drawing portion 32 is fixed to the coil end 29A by a lacing cord 34B (refer to FIG. 3). The wire bundle 35 has at the distal end thereof away from the drawing portion 32 a connecting portion 36 where the core wires 30A of the coils 30U, 30V and 30W are connected together. The connecting portion 36 provides a neutral point of the electric motor M.

The wire bundle 35 also has an elongated portion 37 so that a predetermined length of the wire bundle 35 is ensured between the drawing portion 32 and the connecting portion 36. Thus, the wire bundle 35 is made longer then the wire bundle that consists only of the drawing portion 32 and the connecting portion 36 by the length corresponding to the elongated portion 37. Each core wire 30A at the elongated portion 37 is entirely covered by its insulator 30B. The elongated portion 37 is provided for making the creepage distance between the connecting portion 36 and the housing 11 longer thereby to increase the insulation resistance therebetween.

Figure 4:
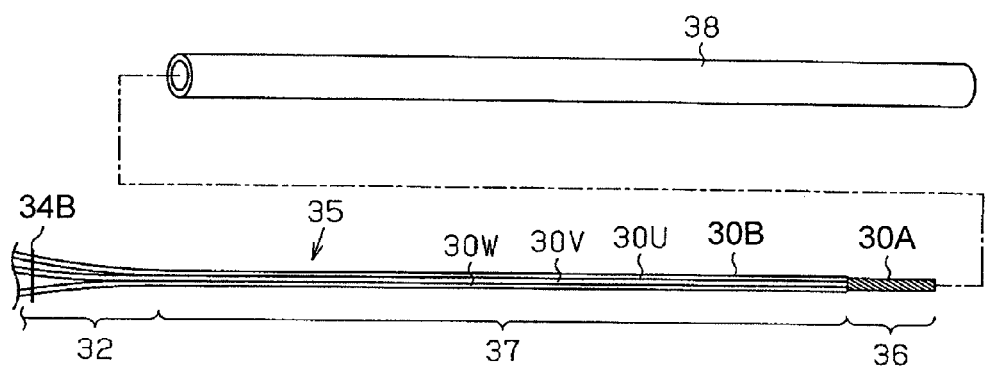
FIG. 4 is an exploded perspective view showing a wire bundle and an insulating tube of the stator of FIG. 3.

As shown in FIGS. 4 and 5, the wire bundle 35 is covered by a heat-shrinkable insulating tube 38. More specifically, the connecting portion 36 and the elongated portion 37 of the wire bundle 35 are covered with the insulating tube 38 and the drawing portion 32 is exposed out of the insulating tube 38. Thus, the drawing portion 32 extends out from the opened end of the insulating tube 38 to the coil end 29A. The wire bundle 35 and the insulating tube 38 cooperate to form a covered bundle portion 39. As shown in FIG. 3, the covered bundle portion 39 has an elongated shape and is bent in an arcuate shape so as to follow the coil end 29A. Although any suitable resin having an insulation property shutting off the leakage current of the motor-driven compressor 10, including rubber-based material and plastic-based material, may be used for the insulating tube 38, fluorine-based resin is preferably used in terms of the refrigerant resistance and the oil resistance. The insulating tube 38 is of an elongated tubular shape having one end thereof opened and the other end thereof closed. The insulating tube 38 is so made that liquid refrigerant is allowed to enter into the insulating tube 38 only from the opened end thereof.

The wire bundle 35 is covered with the insulating tube 38 with the distal end of the connecting portion 36 in contact with the inner end of the insulating tube 38. The insulating tube 38 is radially shrunk by heating at such a position that the insulating tube 38 is in close contact with the elongated portion 37 of the wire bundle 35. The covered bundle portion 39 is formed to allow liquid refrigerant to enter into the insulating tube 38 through the opened end thereof. The inner peripheral surface of the insulating tube 38 and the insulator 30B of the coils 30U, 30V, 30W facing the inner peripheral surface of the insulating tube 38 are insulated from each other so as not to be electrically conducted through liquid refrigerant.

The length of the covered bundle portion 39 between the opened end of the insulating tube 38 and the distal end of the elongated portion 37 adjacent to the connecting portion 36 is preferably set to a quarter of the circumference of the cylindrical core 21 or more with the covered bundle portion 39 installed on the coil end 29A as shown in FIG. 3. The above length setting of the covered bundle portion 39 to make longer the creepage distance between the connecting portion 36 and the housing 11 is made to ensure the necessary insulation resistance. In order to avoid interference of the elongated portion 37 and the insulating tube 38 with the housing 11 or the coil end 29A due to the excessive length, the length of the covered bundle portion 39 between the opened end of the insulating tube 38 and the distal end of the elongated portion 37 adjacent to the connecting portion 36 is preferably set to the length of the circumference of the cylindrical core 21 or less. It is noted that the length of the elongated portion 37 and the insulating tube 38 is set depending on the material of the housing 11, the kind of the refrigerant and the oil, and so forth.

When the operation of the motor-driven compressor 10 having the above-described covered bundle portion 39 is stopped and refrigerant gas remaining in the housing 11 is cooled to be liquefied and collected therein in the form of a liquid, part of the liquid refrigerant enters into the insulating tube 38 through the opened end thereof. Then, the electric current supplied to the connecting portion 36 leaks to the housing 11 through the liquid refrigerant having a small specific resistivity. In this case, the electric current leaks to the housing 11 through the lubricating oil that reduces its specific resistivity by being mixed with liquid refrigerant.

Figure 6A:
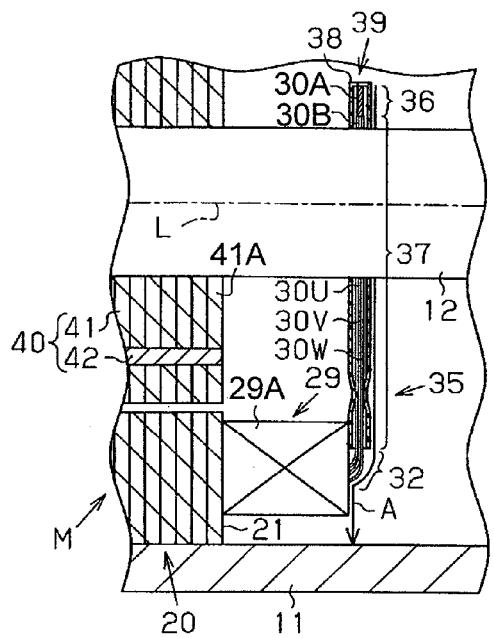
FIG. 6A is an illustrative view showing function of the covered bundle portion.
Figure 6B:
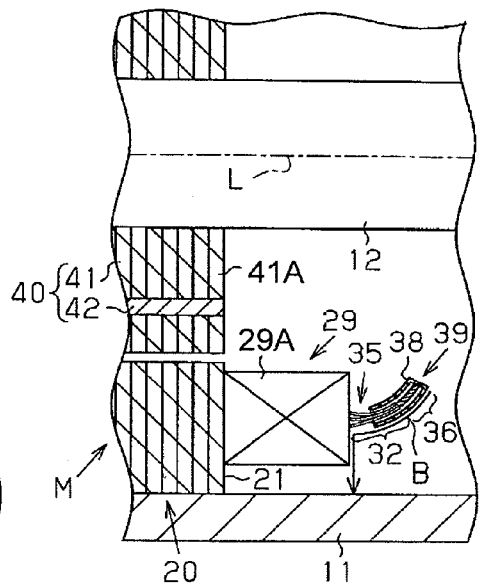
FIG. 6B is an illustrative view showing function of a covered bundle portion having no elongated portion in the wire bundle.

FIGS. 6A and 6B provide schematic illustrations to describe understandably the function of the covered bundle portion 39. In order to increase the length between the drawing portion 32 and the connecting portion 36, the connecting portion 36 is distanced from the drawing portion 32 for the length of the elongated portion 37, as shown in FIG. 6A. The connecting portion 36 and the elongated portion 37 are covered with the insulating tube 38 and the insulator 30B of the elongated portion 37 and the insulating tube 38 are isolated from each other. Therefore, the current leaked from the connecting portion 36 flows toward the opened end of the insulating tube 38 through liquid refrigerant in the direction indicated by the arrow A along the elongated portion 37. Then, the leakage current flows to the housing 11 through the liquid refrigerant outside the insulating tube 38. The length of the arrow A represents the creepage distance between the connecting portion 36 and the housing 11.

On the other hand if the wire bundle 35 consisted only of the drawing portion 32 and the connecting portion 36 as shown in FIG. 6B, the length of the insulating tube 38 would be decreased. As compared to the present embodiment wherein the wire bundle 35 is provided with the elongated portion 37, the creepage distance between the connecting portion 36 and the housing 11, or the length of the arrow B, in the case of FIG. 6B would be decreased. The insulation resistance due to liquid refrigerant is increased with an increase of the distance for which leakage current flows through liquid refrigerant (or the creepage distance). Therefore, providing the wire bundle 35 with the elongated portion 37, the creepage distance between the connecting portion 36 and the housing 11 is increased.

The motor-driven compressor of the above-described embodiment offers the following advantageous effects.

(1) The coils 30U, 30V and 30W are bundled at one ends thereof to form the wire bundle 35. The wire bundle 35 includes the elongated portion 37 having a predetermined length and located between the drawing portion 32 and the connecting portion 36 of the wire bundle 35, so that the length of the insulating tube 38 that covers the wire bundle 35 is longer as compared to the case wherein the wire bundle is not provided with the elongated portion. Although the leakage current between the connecting portion 36 and the housing 11 flows through the liquid refrigerant having the lowest specific resistivity therebetween, the creepage distance between the connecting portion 36 and the housing 11 is increased with an increase of the length of the insulating tube 38. Therefore, the insulation resistance between the connecting portion 36 and the housing 11 is increased by the provision of the elongated portion 37. Even if the liquid refrigerant having a low specific resistivity is collected in the housing 11 and the liquid refrigerant contains lubricating oil that reduces its specific resistivity by being mixed with the liquid refrigerant, the insulation resistance between the connecting portion 36 of the wire bundle 35 and the housing 11 is increased by the increased length of the insulating tube 38 covering the elongated portion 37. Consequently, current supplied to the neutral point (or the connecting portion 36) is prevented from leaking to the housing 11 through the liquid refrigerant.

(2) The heat-shrinkable insulating tube 38 is shrunk by heating, such that the gap between the elongated portion 37 and the inner periphery of the insulating tube 38 is reduced and the area of the passage of leakage current flowing through the liquid refrigerant is reduced, accordingly. Therefore, the insulation resistance is increased as compared to the case wherein the insulating tube 38 is not shrunk by heating.

(3) Because the U-phase coil 30U, the V-phase coil 30V and the W-phase coil 30W are formed by winding conductive wires in the slots 23U, 23V, 23W in the manner of wave winding, respectively, the projection of the coil end 29A from the stator core 21 is restricted. Therefore, the stator 20 is prevented from increasing in size despite the presence of the elongated wire bundle 35 due to the provision of the elongated portion 37.

(4) The core wire 30A of the elongated portion 37 of the wire bundle 35 is covered by the insulator 30B. Therefore, while the wire bundle 35 is provided with the elongated portion 37, the exposed conductive portion of the wire bundle 35 is limited to the connecting portion 36, so that the insulation resistance is increased.

(5) In order to isolate the connecting portion 36 and the housing 11 from each other, the interior of the insulating tube 38 may be filled with any adhesive or, alternatively, the stator 20 may be completely covered with resin. However, it is technically difficult to prevent the formation of pores in the adhesive or resin. It is also difficult to ensure insulation property of the adhesive or resin in view of their deterioration. In the present embodiment, however, in forming the covered bundle portion 39, the length of the coils 30U, 30V and 30W is simply increased to have the elongated portion 37 in the wire bundle 35 and the length of the insulating tube 38 is simply increased, accordingly. Thus, the productivity in manufacturing the motor-driven compressor 10 is improved while the insulation resistance is increased. In addition, there is no fear of decreasing the insulation property.

The above-described embodiment may be modified as exemplified below.

Figure 7:
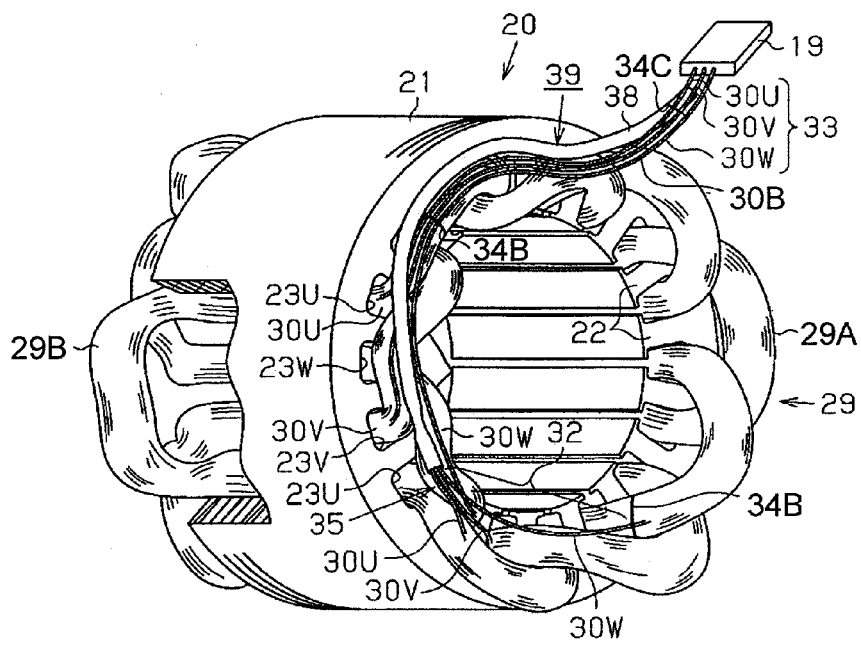
FIG. 7 is a perspective view showing another placement of the covered bundle portion.

As shown in FIG. 7, the covered bundle portion 39 may be placed along the extension 33 so that the covered bundle portion 39 is fixed at the distal end thereof away from the drawing portion 32 to the extension 33 by a lacing cord 34C. In this structure, the covered bundle portion 39 is not interfered with any parts in the housing 11. As compared to the above-described embodiment wherein the covered bundle portion 39 is placed along the circumference of the coil end 29A, the projection of the coil end 29A due to the presence of the covered bundle portion 39 is lessened. Therefore, the electric motor M is prevented from being increased in size while increasing the insulation resistance between the housing 11 and the connecting portion 36 by the covered bundle portion 39.

By installing the motor-driven compressor 10 in a vehicle with the input terminal 19 of the extension 33 of the electric motor M located at an upper part of the housing 11, the connecting portion 36 of the covered bundle portion 39 tends to be located above the level of liquid refrigerant when the liquid refrigerant is collected in the housing 11, which helps to reduce the fear of electric current leaking through the liquid refrigerant. Because the connecting portion 36 does not need to be put in liquid refrigerant in inspecting the electric motor M for its insulation resistance through liquid refrigerant, the coils 29 may be inspected accurately for any pinholes.

Figure 8:
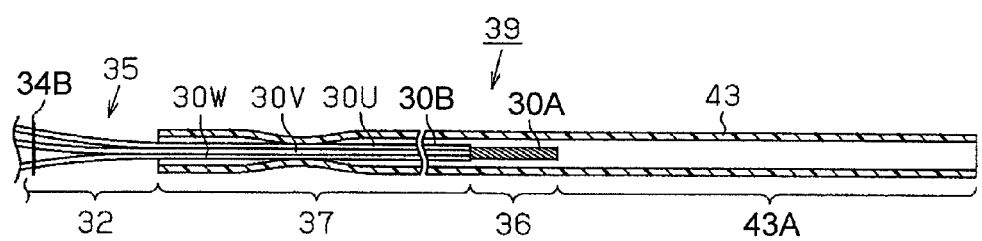
FIG. 8 is a longitudinal sectional view showing another covered bundle portion, wherein the wire bundle is inserted in another insulating tube.

As shown in FIG. 8, an insulating tube 43 may be used instead of the insulating tube 38. The insulating tube 43 differs from the insulating tube 38 in that the opposite ends are opened and the tube itself is made longer than the insulating tube 38. That is, with the wire bundle 35 inserted in the insulating tube 43 from one opened end of the insulating tube 43, the insulating tube 43 has an elongated portion 43A in which the wire bundle 35 is covered so as to increase the creepage distance between the connecting portion 36 and the housing 11 thereby to increase the insulation resistance. Therefore, the insulating tube 43 is longer than the insulating tube 38 by the length of the elongated portion 43A.

In this structure, liquid refrigerant enters into the insulating tube 43 from both opened ends thereof. The electric current supplied to the connecting portion 36 leaks from both opened ends of the insulating tube 43 to the housing 11 through liquid refrigerant having a small specific resistivity. In this case, the electric current leaks to the housing 11 through the lubricating oil that reduces its specific resistivity by being mixed with liquid refrigerant. As described earlier with reference to the above embodiment, the provision of the elongated portion 37 in the wire bundle 35 increases the creepage distance between the connecting portion 36 and the housing 11, so that the insulation resistance between the connecting portion 36 and the housing 11 is increased when leakage current flows from the opened end of the insulating tube 43 adjacent to the drawing portion 32 to the housing 11. When leakage current flows from the opened end of the insulating tube 43 adjacent to the elongated portion 43A to the housing 11, on the other hand, leakage current from the connecting portion 36 flows along the elongated portion 43A through the liquid refrigerant. Because the creepage distance between the connecting portion 36 and the housing 11 is increased, the insulation resistance between the connecting portion 36 and the housing 11 is increased, accordingly.

The insulating tube 43 which is opened at both ends is made more easily as compared to the insulating tube whose one end is closed by thermal welding. It is preferable to use heat-shrinkable material in making the insulating tube 43 and also to thermally shrink the elongated portion 43A of the insulating tube 43 thereby to reduce the area of the passage of the elongated portion 43A. In this structure, the passage of the elongated portion 43A through which leakage current flows through the liquid refrigerant is reduced, so that insulation resistance is increased as compared to the case wherein the elongated portion 43A is not thermally shrunk.

Figure 9:
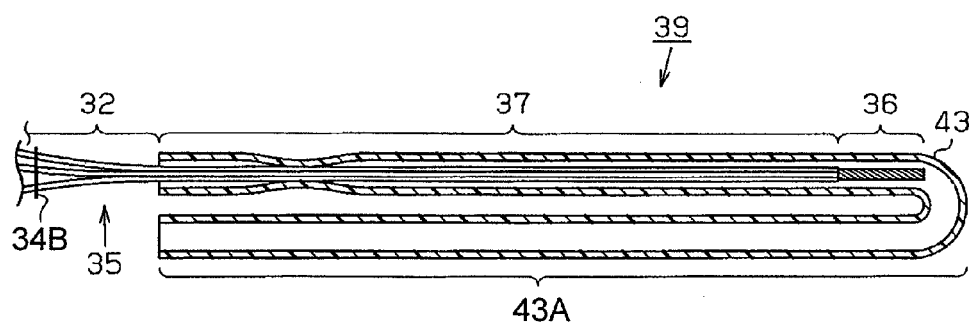
FIG. 9 is a longitudinal sectional view showing yet another covered bundle portion, which is folded back.

As shown in FIG. 9, the covered bundle portion 39 may have a plurality of sections (two sections in the case of FIG. 9) by folding back the elongated portion 43A at a position corresponding to the distal end of the connecting portion 36. The covered bundle portion 39 thus folded is advantageous in that it can be made compact.

The insulating tube 38 does not need to be thermally shrunk.

In the above-described embodiment, the U-phase coil 30U, the V-phase coil 30V and the W-phase coil 30W are formed by winding conductive wires in the slots 23U, 23V, 23W in the manner of wave winding, respectively. According to the present invention, however, the winding manner of the conductive wires in the slots 23U, 23V, 23W is not limited to the wave winding.

In the above-described embodiment, it is desirable that the surface area of the connecting portion 36 should be as small as possible for increasing the insulation resistance.

In the above-described embodiment, the wire bundle 35 is covered with the insulating tube 38 with the distal end of the connecting portion 36 in contact with the inner end of the insulating tube 38. According to the present invention, however, the distal end of the connecting portion 36 does not need to be in contact with the inner end of the insulating tube 38 if a sufficient insulation resistance is increased between the connecting portion 36 and the housing 11.

In the above-described embodiment, the electric motor M has three-phase coils 29. However, the electric motor M may have any other polyphase coils other than the three-phase coils.

What is claimed is:

1. A motor-driven compressor comprising:
a metal housing;
a compression unit for compressing refrigerant housed in the housing; and
an electric motor for driving the compression unit housed in the housing, wherein the electric motor includes a cylindrical stator that is formed with a plurality of slots separated by teeth, wherein the cylindrical stator has polyphase coils that are formed by winding a plurality of conductive wires in the slots to have polyphase, a wire bundle that is formed by drawing out one end of each conductive wire from the polyphase coils and binding the ends of the conductive wires together, and an insulating tube covering the wire bundle, wherein each conductive wire includes a core wire and an insulator that covers the core wire, wherein the wire bundle has a drawing portion that draws out the conductive wires from the polyphase coils, a connecting portion where the core wires of the conductive wires are connected at the ends of the conductive wires together and an elongated portion that is elongated between the drawing portion and the connecting portion for increasing creepage distance between the connecting portion and the housing to increase insulation resistance, wherein the connecting portion of the wire bundle provides a neutral point of the electric motor, wherein the elongated portion and the connecting portion of the wire bundle are covered with the insulating tube.

2. The motor-driven compressor according to claim 1, wherein the insulating tube is of an elongated tubular shape having one end thereof opened and the other end thereof closed.

3. The motor-driven compressor according to claim 1, wherein the insulating tube is formed so that opposite ends thereof are opened, wherein with the wire bundle inserted in the insulating tube from one opened end of the insulating tube, the insulating tube has an elongated portion in which the wire bundle is covered so as to increase the creepage distance between the connecting portion and the other opened end of the insulating tube.

4. The motor-driven compressor according to claim 3, wherein the elongated portion of the insulating tube is folded back at a position corresponding to a distal end of the connecting portion.

5. The motor-driven compressor according to claim 1, wherein the wire bundle and the insulating tube form a covered bundle portion, wherein when the other end of each conductive wire is drawn out from the polyphase coils and connected to an input terminal, the other ends of the conductive wires form an extension, wherein the covered bundle portion is placed along the extension.

6. The motor-driven compressor according to claim 5, wherein the covered bundle portion is fixed to the extension by a lacing cord.

7. The motor-driven compressor according to claim 1, wherein the insulating tube is heat-shrinkable.

8. The motor-driven compressor according to claim 1, wherein the conductive wires are wound in the slots in the manner of wave winding.

9. The motor-driven compressor according to claim 1, wherein each core wire at the elongated portion of the wire bundle is entirely covered by its insulator.

10. The motor-driven compressor according to claim 1, wherein the refrigerant in the metal housing contains lubricating oil of polyalkylene glycol.

* * * * *